United States Patent
Lee et al.

(10) Patent No.: US 7,653,039 B2
(45) Date of Patent: Jan. 26, 2010

(54) NETWORK SYSTEM FOR INTERWORKING W-LAN AND 3G MOBILE COMMUNICATION NETWORK THROUGH ROF LINK AND AUTHENTICATION METHOD ACCORDING TO INTERWORKING IN THE NETWORK SYSTEM

(75) Inventors: Gyu-Woong Lee, Suwon-si (KR); Kwan-Soo Lee, Seoul (KR); Chang-Sup Shim, Seoul (KR); Yun-Je Oh, Yongin-si (KR); Jae-Hoon Lee, Seoul (KR); Seong-Taek Hwang, Pyeongtaek-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 656 days.

(21) Appl. No.: 11/356,822

(22) Filed: Feb. 17, 2006

(65) Prior Publication Data

US 2006/0209800 A1 Sep. 21, 2006

(30) Foreign Application Priority Data

Feb. 18, 2005 (KR) .................. 10-2005-0013613

(51) Int. Cl.
*H04W 4/00* (2009.01)
(52) U.S. Cl. ............... 370/338; 370/331; 455/422.1; 455/436
(58) Field of Classification Search ............ 370/331, 370/338; 455/422.1, 436
See application file for complete search history.

(56) References Cited

U.S. PATENT DOCUMENTS

2002/0120761 A1* 8/2002 Berg ..................... 709/230

(Continued)

FOREIGN PATENT DOCUMENTS

JP 2003-299143 10/2003

(Continued)

OTHER PUBLICATIONS

Chanda, "Performance of Clipped OFDM Signal in Fiber", Published 2004.*

(Continued)

*Primary Examiner*—Ayaz R Sheikh
*Assistant Examiner*—Tarell Hampton
(74) *Attorney, Agent, or Firm*—Cha & Reiter, LLC

(57) ABSTRACT

A network system for interworking a Wireless Local Area Network (W-LAN) and a $3^{rd}$-Generation (3G) mobile communication network through a Radio-over-Fiber(RoF) link and an authentication method in interworking in the network system are provided. The network system includes a 3G mobile communication network and a W-LAN system. The 3G mobile communication network includes a voice signal processing network connected to a Public Switched Telephone Network (PSTN) for voice call processing with respect to a predetermined mobile terminal, a packet data network for data communication with the predetermined mobile terminal, and a terminal device for communication with the predetermined mobile terminal. The W-LAN system is connected to the packet data network of the 3G mobile communication network to provide a W-LAN service to the predetermined mobile communication terminal. The W-LAN system is implemented in a plurality of Base Transceiver Stations (BTSs) included in the 3G mobile communication network through the RoF link.

18 Claims, 8 Drawing Sheets

U.S. PATENT DOCUMENTS

| | | | |
|---|---|---|---|
| 2002/0136226 A1* | 9/2002 | Christoffel et al. | 370/401 |
| 2003/0039234 A1* | 2/2003 | Sharma et al. | 370/338 |
| 2003/0041023 A1* | 2/2003 | Goldstein et al. | 705/39 |
| 2004/0090937 A1* | 5/2004 | Chaskar et al. | 370/331 |
| 2005/0088999 A1* | 4/2005 | Waylett et al. | 370/338 |
| 2005/0245243 A1* | 11/2005 | Zuniga | 455/414.3 |
| 2006/0120171 A1* | 6/2006 | Touati et al. | 365/189.05 |

FOREIGN PATENT DOCUMENTS

| | | |
|---|---|---|
| JP | 2004-357187 | 12/2004 |
| KR | 2003-0065234 | 8/2003 |
| WO | WO 03/105493 | 12/2003 |

OTHER PUBLICATIONS

Perkins, RFC3344 : "IP Mobility Support for IPv4", Published : Aug. 2002.*

Ahmavaara, K.; Haverinen, H.; Pichna, R., "Interworking architecture between 3GPP and WLAN systems," Communications Magazine, IEEE , vol. 41, No. 11, pp. 74-81, Nov. 2003.*

Mingxin Chen; Gan Liu; Guangxi Zhu; Xu Zhu, "A Novel Internetworking Architecture between WLAN and UMTS Cellular Networks using RoF Technique," Circuits and Systems for Communications, 2008. ICCSC 2008. 4th IEEE International Conference on , vol., no., pp. 693-697, May 26-28, 2008.*

Salkintzis, A.K., "Interworking techniques and architectures for WLAN/3G integration toward 4G mobile data networks," Wireless Communications, IEEE , vol. 11, No. 3, pp. 50-61, Jun. 2004.*

Varma, V.K.; Ramesh, S.; Wong, K.D.; Barton, M.; Hayward, G.; Friedhoffer, J.A., "Mobility management in integrated UMTS/WLAN networks," Communications, 2003. ICC '03. IEEE International Conference on , vol. 2, no., pp. 1048-1053 vol. 2, May 11-15, 2003.*

"Development of Wireless Base Station Apparatus For The Economic Expansion of FOMA Area;" FOMA; NTT DoCoMo; Vo. 12, No. 1; Apr. 2004.

* cited by examiner

NETWORK SYSTEM FOR INTERWORKING W-LAN AND 3G MOBILE COMMUNICATION NETWORK THROUGH ROF LINK AND AUTHENTICATION METHOD ACCORDING TO INTERWORKING IN THE NETWORK SYSTEM

CLAIM OF PRIORITY

This application claims priority under 35 U.S.C. §119 to an application entitled "Network System for Interworking W-LAN and 3G Mobile Communication Network through Radio-over-Fiber Link and Authentication Method according to Interworking in the Network System," filed in the Korean Intellectual Property Office on Feb. 18, 2005 and assigned Serial No. 2005-13613, the contents of which are incorporated herein by reference.

BACKGROUND OF THE INVENTION

1. Field of the Invention

The present invention generally relates to a network system for interworking a Wireless Local Area Network (W-LAN) and a $3^{rd}$-Generation (3G) mobile communication network, and in particular, to a network system for interworking a W-LAN and a 3G mobile communication network through a Radio-over-Fiber (RoF) link.

2. Description of the Related Art

The recent activation of wireless Internet services and W-LANs has made interworking a 3G mobile communication network and a W-LAN more appealing to service providers and mobile users.

Interworking a W-LAN and a 3G system is appealing to service providers and mobile users because it combines two highly desirable features into one network system. W-LAN service by itself provides high transmission speed, but it has narrow service coverage and limited mobility. Although having wide service coverage and guaranteeing mobility, a 3G (CDMA-2000 or UMTS) service by itself has lower data transmission speed and is more expensive than the W-LAN service. For these reasons, interworking a W-LAN system and a 3G system has significance in that it creates customer satisfaction and market opportunities by utilizing advantages inherent in the W-LAN system and the 3G system.

Interworking systems can be a tightly coupled system or a loosely coupled system. In the tightly coupled system, functions such as authentication are implemented by the 3G system. In the loosely coupled system, functions such as authentication are implemented by both the 3G system and the W-LAN system.

FIG. 1 illustrates a conventional tightly coupled network interworking a W-LAN system and a 3G system. As illustrated in FIG. 1, in the conventional tightly coupled network, a W-LAN system 300 is connected to a remote network 400 for packet communication and a 3G core network 100 having communication networks 104, 105, and 106.

The 3G core network 100 which is connected to the Internet 200 is linked with the remote network 400 and the W-LAN system 300 through a Packet Data Service Node (PDSN) 103 wherein Internet Protocol (IP) is utilized to connect to a packet communication network.

The remote network 400 includes Base Transceiver Stations (BTSs) 111-1 and 111-2 for connection with a Mobile Station (MS) 112, a Base Station Controller (BSC) 110 for managing the BTSs 111-1 and 111-2, and a Packet Control Function (PCF) 109 for performing a buffering function and managing the state of the MS 112 in data transmission from and to a Packet Data Service Node (PDSN).

The remote network 400 is connected to a Home Location Register (HLR) 106 through a Mobile Switching Center (MSC) 104 and the PSTN 105.

The W-LAN system 300 is connected to the PDSN 103 and the 3G core network 100 and includes an Access Controller (AC) 107 for managing Access Points (APs) and a plurality of APs 108-1, 108-2, and 108-3 for connection with a W-LAN terminal 113 for W-LAN service.

As illustrated in FIG. 1, in the tightly coupled system, the W-LAN system 300 is connected to the 3G core network 100 and the W-LAN system 300 operates as a part of a 3G network. MS 112 and the W-LAN terminal 113 use a 3G service through the remote network 400 of a 3G system or the W-LAN system 300 according to a network connection environment. Thus, interworking of a 3G network and a network of the W-LAN system 300, requires separate interworking equipment where basic service control and management function is performed by the 3G network. In other words, the 3G core network 100 includes a Home Agent (HA) 102 for position management and an Authentication, Authorization, and Accounting (AAA) server 101 for authentication.

FIG. 2 illustrates a conventional loosely coupled network interworking a W-LAN system and a 3G system. As illustrated in FIG. 2, in the conventional loosely coupled network, authentication is independently preformed by a remote network 400 for packet communication, a 3G core network 100 having communication networks 204, 205, and 206, and a W-LAN system 300.

The 3G core network 100 which is connected to the Internet 200 is linked with the remote network 400 and the W-LAN system 300 through a PDSN 203 wherein Internet Protocol (IP) is utilized to connect to a packet communication network.

The remote network 400 includes BTSs 212-1 and 212-2 for connection with an MS 214, a BSC 211 for managing Base Transceiver Stations (BTSs) 212-1 and 212-2, and a PCF 210 for performing a buffering function and managing the state of the MS 214 in data transmission from and to the PDSN 203.

The remote network 400 is connected to a HLR 206 through an MSC 204 and a PSTN 205.

The W-LAN system 300 is connected to the PDSN 203 and the 3G core network 100 and includes an AC 207 for managing APs, a plurality of APs 209-1, 209-2, and 209-3 for connection with a W-LAN terminal 213 for a W-LAN service, and an AAA server 208 for authentication of the W-LAN system 300.

As illustrated in FIG. 2, in the loosely coupled system, the 3G core network 100 and the W-LAN system 300 independently operate. Interworking is performed such that 3G networks 100 and 400 and the W-LAN system 300 operate independently but interface information for interworking related to billing and authentication is transmitted to AAA servers 201 and 208 included in the 3G networks 100 and 400 and the W-LAN system 300.

As described above, a conventional network interworking a W-LAN system and a 3G system is divided into a tightly coupled network and a loosely coupled network. The tightly coupled network has an advantage in that it has the added functions of a conventional 3G system, related to security, authentication, and billing, which can be applied to a W-LAN system. However, modules related to interworking with the 3G system need to be mounted in a W-LAN terminal and the time and cost required for standardization increase. As a result, the cost of a subscriber service increases and the load on existing 3G networks may increase since a W-LAN system uses an existing 3G core by sharing a 3G core network, resulting in instability of an existing 3G network system.

On the other hand, a loosely coupled system does not increase the load on 3G networks due to interworking because it uses independent networks. However, since advanced functions such as a position control, a Quality of Service (QoS), and security defined in a 3G network are not supported in a W-LAN system, there exist authentication and security problems in a W-LAN area.

Therefore, a system providing more efficient interworking of a 3G mobile communication network and a W-LAN system is required.

SUMMARY OF THE INVENTION

One aspect of the present invention is to provide a network system for interworking a Wireless Local Area Network (W-LAN) and a $3^{rd}$-Generation (3G) mobile communication network through a Radio-over-Fiber (RoF link), in which a W-LAN system interworks with an existing 3G mobile communication network through the RoF link, and an authentication method in movement between the W-LAN and the 3G mobile communication network according to the configuration of the network system.

It is another aspect of the present invention to provide a network system for interworking a W-LAN and a 3G mobile communication network through a RoF link, in which a new data service is disclosed for a 3G mobile communication network and seamless data transmission of a W-LAN system. The present invention achieves these objectives by combining the high-speed data transmission of a W-LAN system and the wide service coverage of a 3G mobile communication network, and an authentication method in movement between the W-LAN and the 3G mobile communication network according to the configuration of the network system.

According to one aspect of the present invention, there is provided a network system for interworking a W-LAN and a 3G mobile communication network through a RoF link. The network system includes the 3G mobile communication network and a W-LAN system. The 3G mobile communication network includes a voice signal processing network connected to a Public Switched Telephone Network (PSTN) for voice call processing with respect to a predetermined mobile terminal, a packet data network for data communication with the predetermined mobile terminal, and a terminal device for communication with the predetermined mobile terminal. The W-LAN system is connected to the packet data network of the 3G mobile communication network to provide a W-LAN service to the predetermined mobile communication terminal. The W-LAN system is implemented in a plurality of Base Transceiver Stations (BTSs) included in the 3G mobile communication network through the RoF link.

According to another aspect of the present invention, there is provided an authentication method for movement between a 3G mobile communication network and a W-LAN system included in a network system. The 3G mobile communication network includes a voice signal processing network connected to a Public Switched Telephone Network (PSTN) for voice call processing with respect to a predetermined mobile terminal, a packet data network for data communication with the predetermined mobile terminal, and a terminal device for communication with the predetermined mobile terminal. The W-LAN system is connected to the packet data network of the 3G mobile communication network to provide a W-LAN service to the predetermined mobile communication terminal. The W-LAN system is implemented in a plurality of Base Transceiver Stations (BTS) included in the 3G mobile communication network through the RoF link.

In one embodiment, when the predetermined mobile terminal accesses a W-LAN Access Point (AP) region according to the W-LAN system from a 3G mobile communication network cell, the authentication method includes performing setup on the predetermined mobile terminal for the W-LAN system to accept a data service that has been received through the 3G mobile communication network. Then communication is established between the predetermined mobile terminal and the BTSs according to protocol of the W-LAN system upon association between the predetermined mobile terminal. Next the W-LAN system, according to the setup, connects the predetermined mobile terminal to the packet data network through the BTSs according to protocol of the W-LAN system. A response is received to a request for the use of IP through the packet data network and authenticating the use of IP after the connection. In addition, the billing starts according to the authentication and accepting the data service through the W-LAN system.

According to another aspect of the present invention, there is provided an authentication method in movement between a 3G mobile communication network and a W-LAN system included in a network system. When the predetermined mobile terminal moves out of a W-LAN Access Point (AP) region according to the W-LAN system and accesses a 3G mobile communication network cell, the authentication method includes the following steps; first notifying movement of the predetermined mobile terminal to a Home Agent (HA) of the 3G mobile communication network. Next upon request from the predetermined mobile terminal and channel establishment is performed for using the packet data network of the 3G mobile communication network. Then a connection request is transmitted for the packet data network through an authentication server. A response is received to the connection request according to the channel establishment. A connection is established between the predetermined mobile terminal and a Packet Data Service Node (PDSN) through Point-to-Point Protocol (PPP). Then the predetermined mobile terminal transmits an authentication request for service of the 3G mobile communication network to the PDSN of the packet network. Next a response is received to the authentication request, and then billing starts according to the authentication and accepting the data service through the W-LAN system.

BRIEF DESCRIPTION OF THE DRAWINGS

The above features and advantages of the present invention will become more apparent from the following detailed description when taken in conjunction with the accompanying drawings in which.

DETAILED DESCRIPTION

Hereinafter, embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
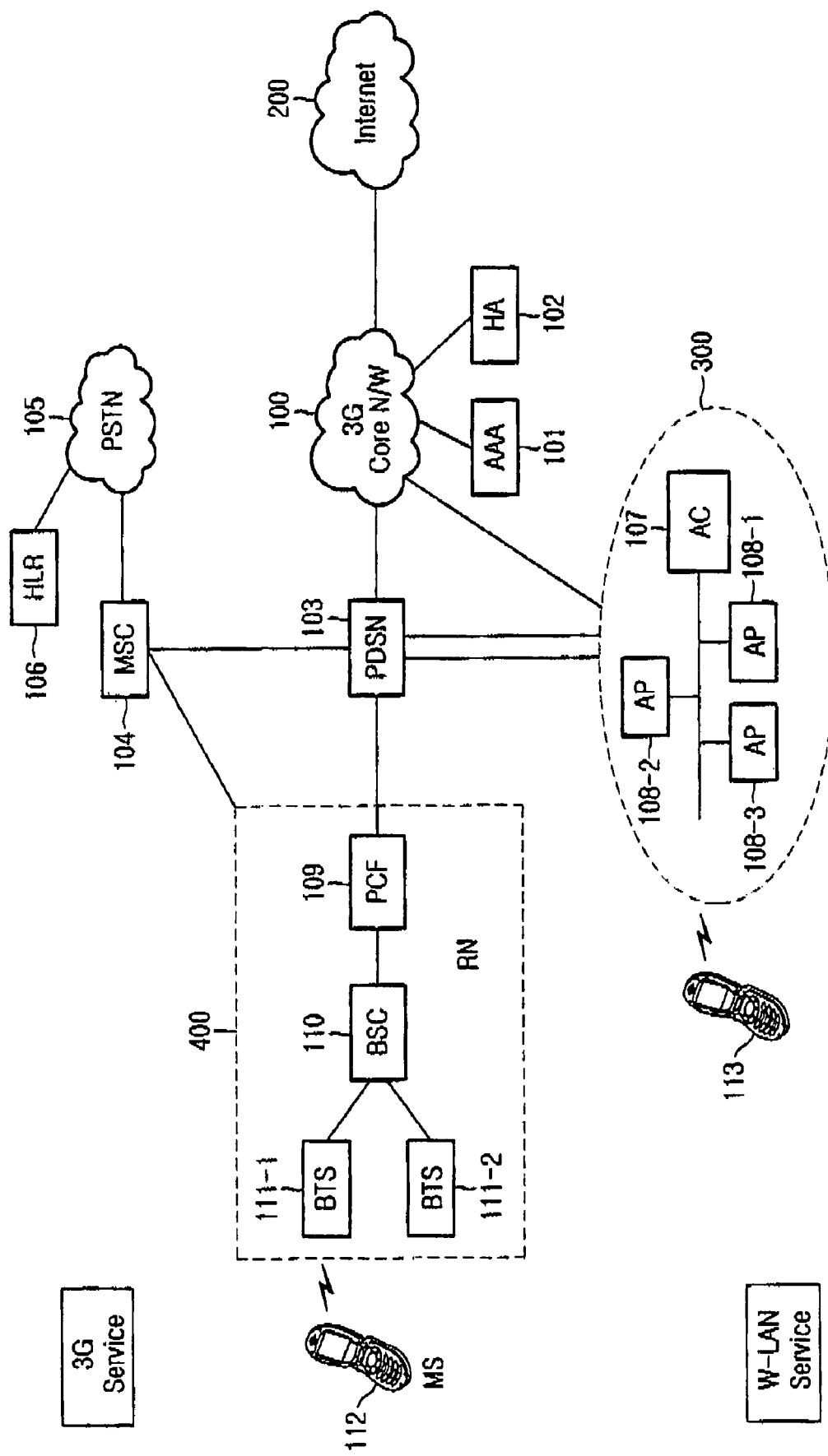
FIG. 1 illustrates a conventional tightly coupled network interworking a W-LAN system and a 3G system.
Figure 2:
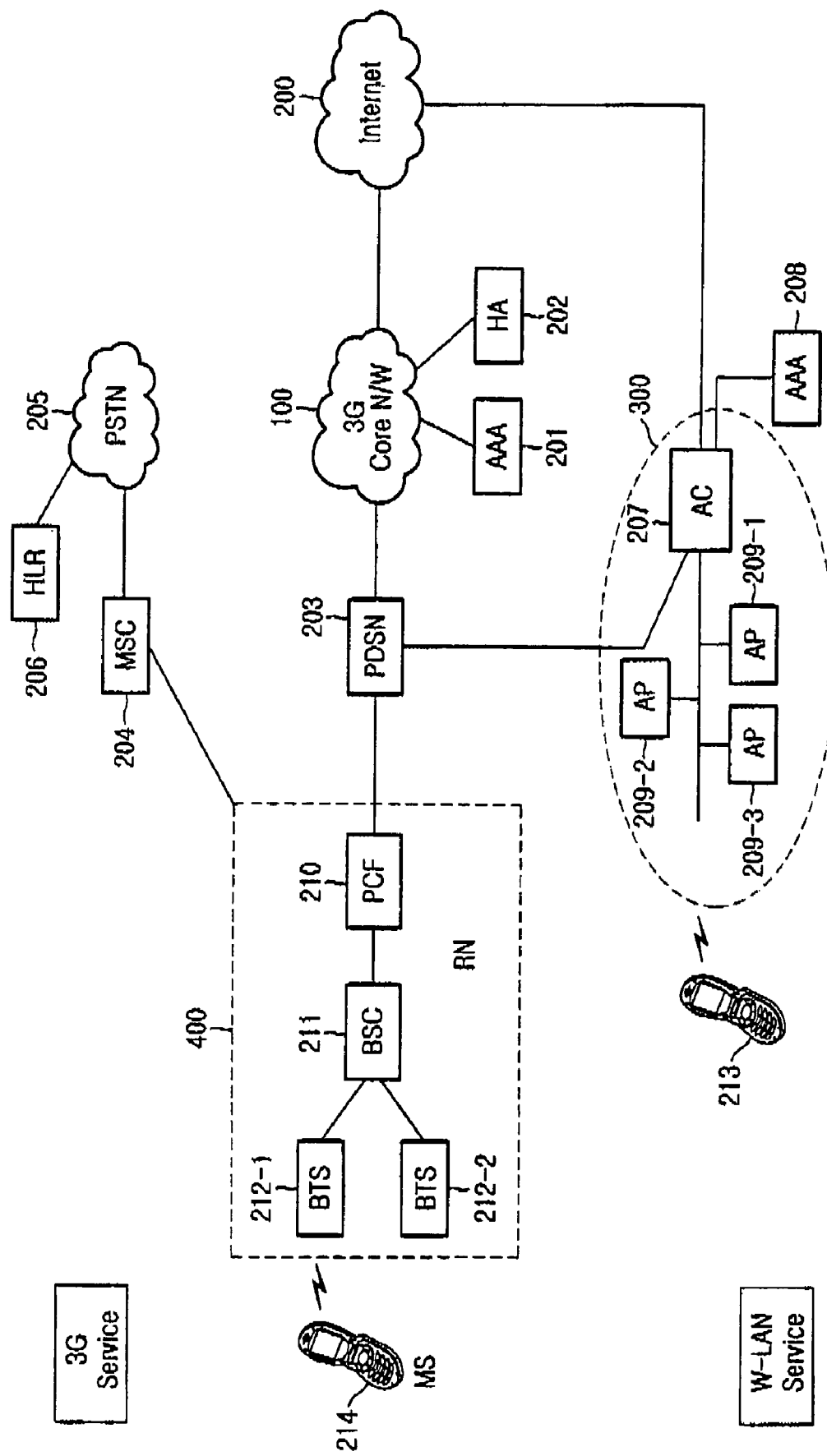
FIG. 2 illustrates a conventional loosely coupled network interworking a W-LAN system and a 3G system.
Figure 3:
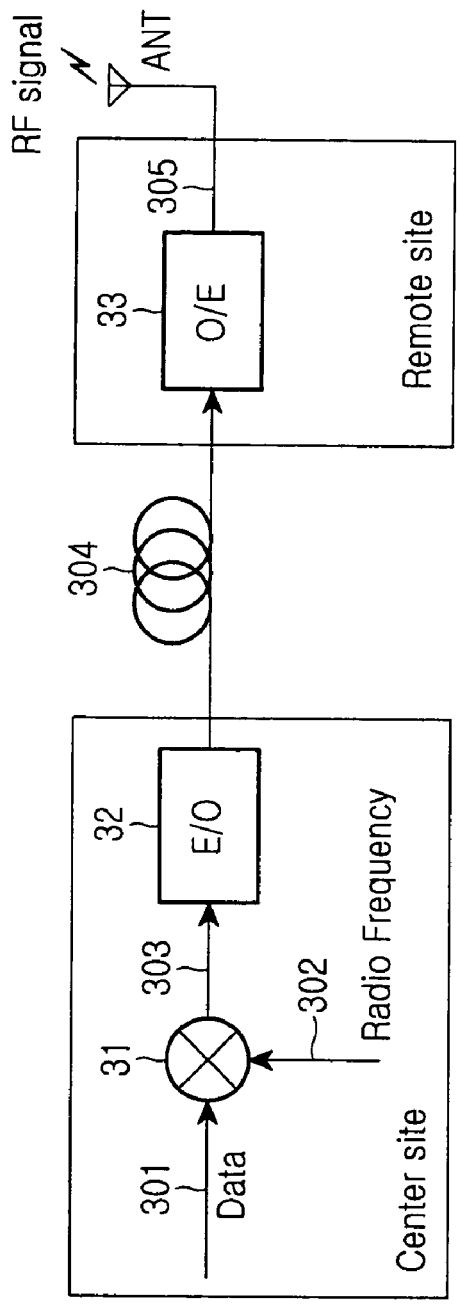
FIG. 3 illustrates a Radio-over-Fiber (RoF) link for transmission of a radio signal according to an embodiment of the present invention.
Figure 3:
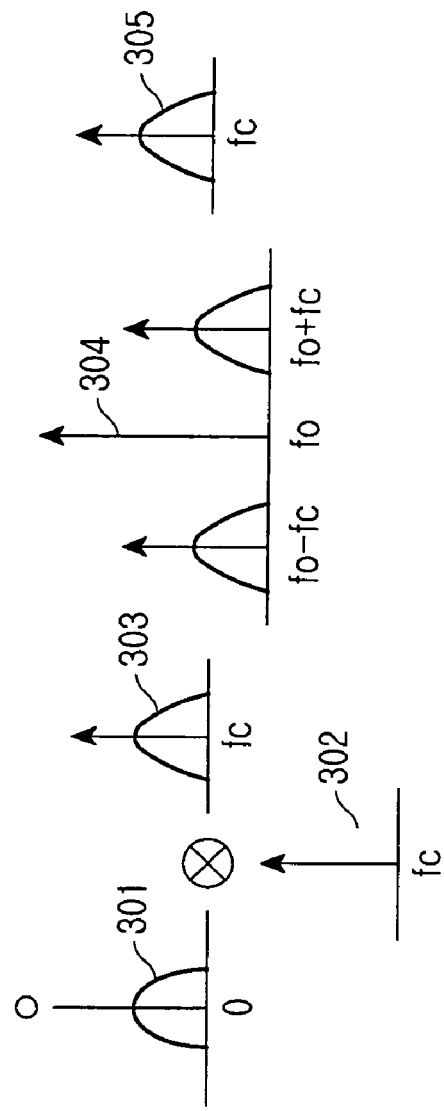

FIG. 3 illustrates a Radio-over-Fiber (RoF) link for transmission of a radio signal according to the present invention.

As illustrated in FIG. 3, the RoF link is a technique for transmission of a radio signal using an optical fiber, in which a center site generates modulation data and optically transmits the modulation data to a remote site for wireless transmission through the remote site.

More specifically, the center site includes a modulator 31 for receiving baseband data 301 for frequency modulation and performing Radio Frequency (RF) modulation on the received baseband data 301 using an RF 302 and an Electro-Optic (E/O) converter 32 for performing E/O conversion on RF-modulated data 303.

The remote site includes an Optic-Electro (O/E) converter 33 for performing O/E conversion on an optical signal 304 transmitted from the center site through an optical path and an antenna ANT for transmitting an O/E-converted RF modulation signal as an RF signal.

Such a RoF link can transmit various forms of radio signals on an optical transmission line through O/E conversion irrespective of the forms of transmitted electric signals. In addition, attenuation in the air or the limit of a transmission distance due to obstacles in wireless remote communication can be overcome using a low-loss optical fiber. Moreover, shadow area minimization and service coverage expansion can be achieved for a mobile communication system such as a 3G system.

Figure 4:
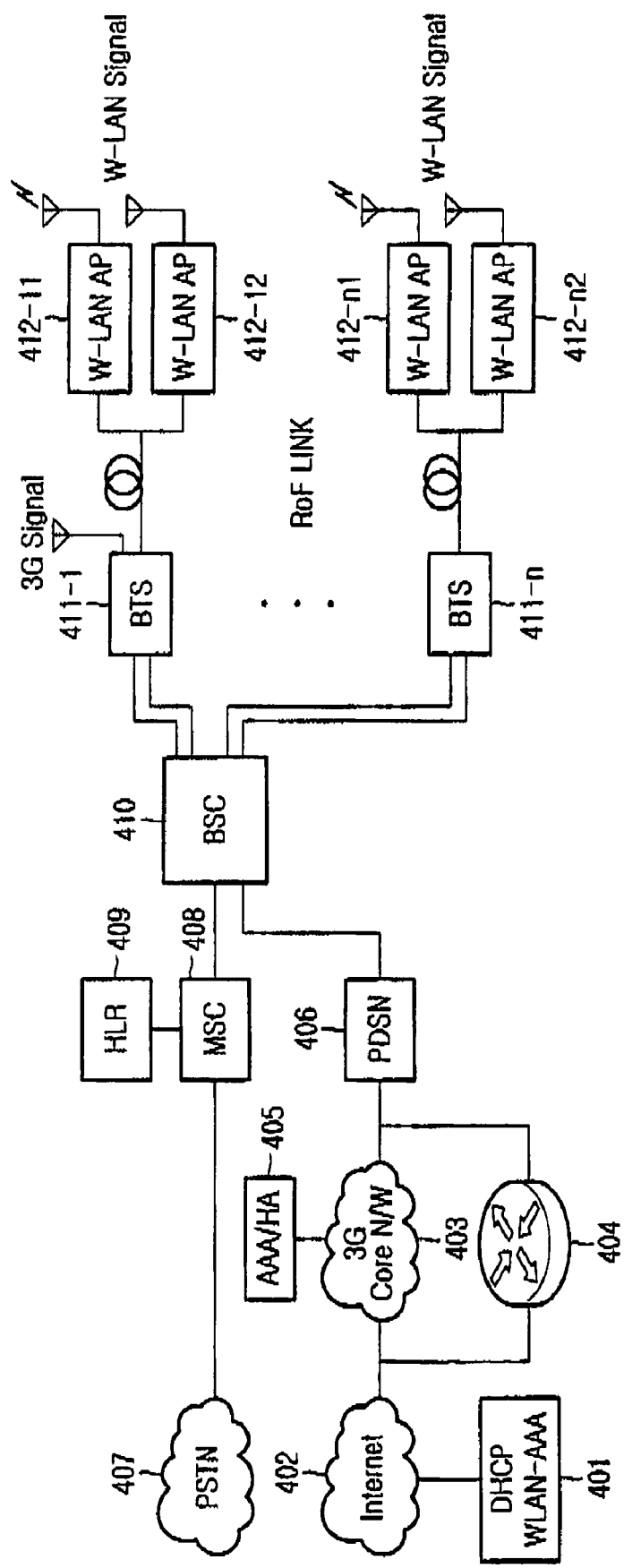
FIG. 4 illustrates a network for interworking a W-LAN and a 3G mobile communication network according to an embodiment of the present invention.

FIG. 4 illustrates a network for interworking a W-LAN and a 3G mobile communication network through a RoF link according to one embodiment of the present invention.

As illustrated in FIG. 4, a network for interworking a W-LAN and a 3G mobile communication network through a RoF link. The interworking network interworks with a W-LAN system in an existing 3G mobile communication network through the terminal device of a 3G mobile communication network over the RoF link. The 3G mobile communication network includes; a voice signal processing network for voice call processing, a packet data network for data communication, and the terminal device for communication with a mobile terminal.

a. Voice Signal Processing Network

The voice signal processing network of the interworking network in a 3G mobile communication network includes a Home Location Register (HLR) 409 used for voice call connection. The HLR maintains information as to a change in a Base Transceiver Stations (BTS) of a mobile terminal or a change in the position of the mobile terminal. A voice signal processing network further includes a Mobile Switching Center (MSC) 408 which is connected to a Public Switched Telephone Network (PSTN) 407 transmits voice calls according to information of the HLR 409.

b. Packet Data Network

A packet data network for data transmission to a mobile terminal of the interworking network has a structure in which a packet data network of the 3G mobile communication network and a data network for the W-LAN system are coupled. Thus, a packet data network includes a Dynamic Host Configuration Protocol (DHCP) server 401 for managing IP addresses of devices included in the W-LAN system and the packet data network of the 3G mobile communication network. In addition, the packet data network includes a 3G core network 403 interworking with an authentication server AAA/Home Agent (HA) 405 to provide a W-LAN service. A router 404 having a path that is different from that of the 3G core network 403 processes connections at the request for W-LAN service. The DHCP 401, 3G core network, and router are connected to the Internet 402. The packet data network further includes a Packet Data Service Node (PDSN) 406 for connection with a packet communication network by connecting to the 3G core network 403 and the router 404 to use IP.

The router 404 is not essential, but is added to reduce the load on the 3G core network 403 caused by interworking with the W-LAN system.

c. Terminal Device for Communication with a Mobile Terminal

The terminal device for transmitting packet data and voice call data of the interworking network includes a Base Station Controller (BSC) 410 connected to the PDSN 406 to control a plurality of Base Transceiver Stations (BTSs) 411-1 through 411-n. The BTSs 411-1 through 411-n are connected to the BSC 410 to perform connection to a mobile terminal for voice communication or data communication, and W-LAN Access Points (APs) 412-11, 412-12 through 412-n1, 412-n2 are connected to the BTS 411-1 through 411-n through the RoF link to provide a W-LAN service.

The interworking network illustrated in FIG. 4 operates as follows:

Transmission of a voice call to a mobile terminal has the same flow as transmission of a signal in the 3G mobile communication network. Thus, a voice call requested by the mobile terminal passes through the BTSs 411-1 through 411-n and the BSC 410 controlling the BTSs 411-1 through 411-n and is connected to the PSTN 407 through the MSC 408 interworking with the HLR 409.

Data communication with a mobile terminal, in an interworking structure provides the capability of maintaining data transmission/reception through a W-LAN service. As such, data communications is maintained with the mobile terminal when data is transmitted and received through BTSs in the subscriber's mobile terminal as in a 3G mobile communication network. Similarly, data is maintained when the mobile terminal moves to a hot spot area during data transmission/reception through the BTSs. The interworking structure will be described in more detail with reference to FIG. 5.

Figure 5:
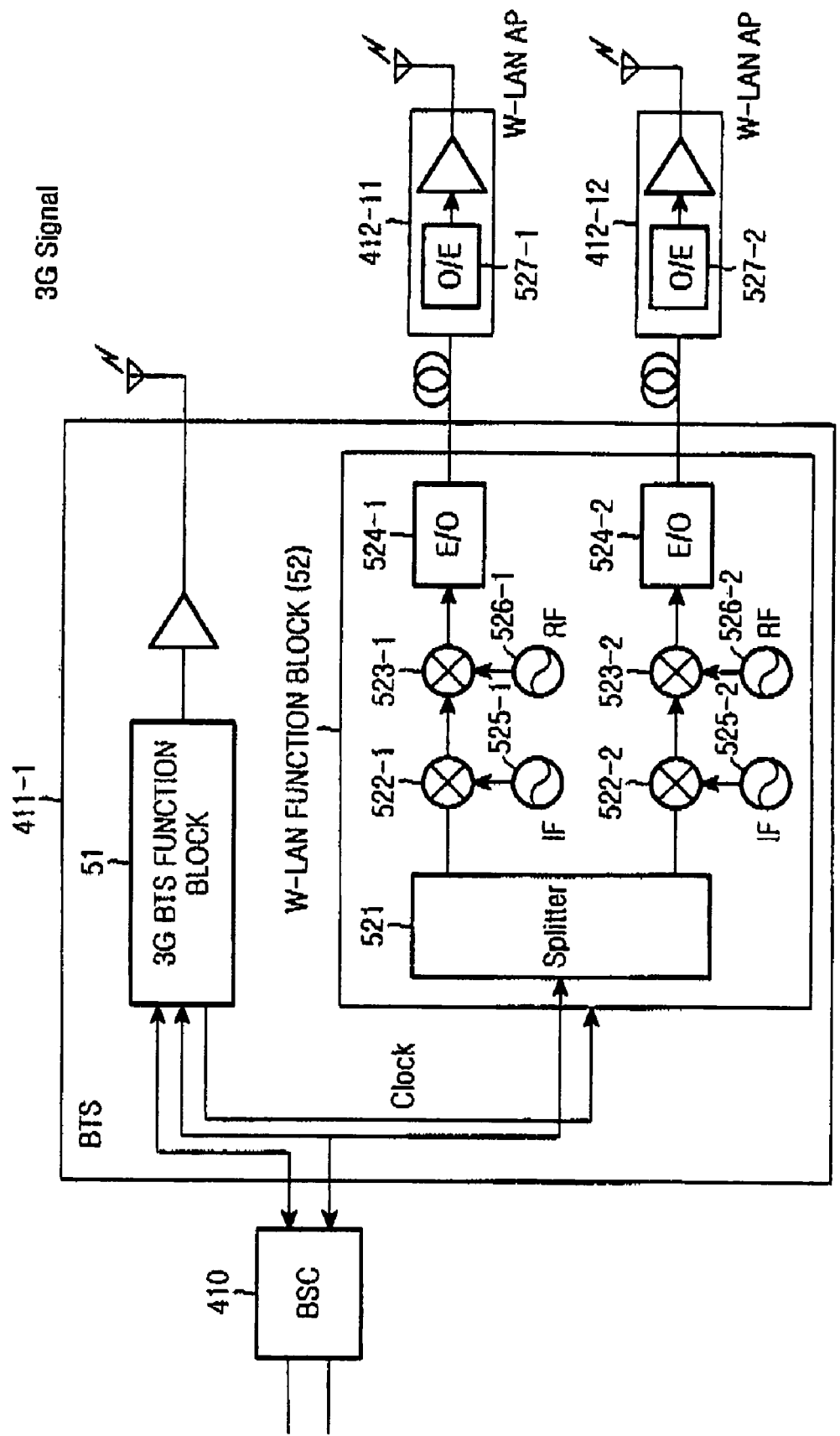
FIG. 5 illustrates a BTS structure of a network for interworking a W-LAN and a 3G mobile communication network through a RoF link according to an embodiment of the present invention.

FIG. 5 illustrates a BTS structure of a network for interworking a W-LAN and a 3G mobile communication network through a RoF link according to the present invention.

As illustrated in FIG. 5, two W-LAN access points (W-LAN AP) 412-11 and 412-12 are connected to the BTS 411-1 of a 3G mobile communication network through a RoF link. A 3G mobile communication service including voice connection and data communication are provided through the antenna for mobile communication, included in the BTS 411-1 of the 3G mobile communication network. A W-LAN service is provided through the W-LAN APs 412-11 and 412-12 and connected through the RoF link.

To this end, the BTS structure includes the BSC 410, a 3G BTS function block 51 for connection with the BSC 410 and for voice call communication and data transmission and to perform transmission to and provide reception from a mobile terminal using 3G mobile communication. In addition, the BTS structure further includes a W-LAN function block 52 for connection with the BSC 410 and for data transmission to the W-LAN APs 412-11 and 412-12 connected through the RoF link.

The W-LAN function block 52 includes a splitter 521, Intermediate Frequency (IF) generators 525-1 and 525-2, IF modulators 522-1 and 522-2, RF generators 526-1 and 526-2, RF modulators 523-1 and 523-2, and E/O converters 524-1 and 524-2. The splitter 521 is connected to the BSC 410 for data communication and splits data from the BSC 410. The IF generators 525-1 and 525-2 generate an IF for modulation of the split data. The IF modulators 522-1 and 522-2 modulate the split data using the generated IF. The RF generators 526-1 and 526-2 generate an RF for modulation of the IF-modulated data into RF band data for a W-LAN. The RF modulators 523-1 and 523-2 modulate the IF-modulated data using the generated RF. The E/O converters 524-1 and 524-2 transmit final up-converted data to the W-LAN APs 412-11 and 412-12 through the RoF link.

The W-LAN function block 52 operates as follows: Packet data provided to the BTS 411-1 for a W-LAN service is provided to the W-LAN function block 52 after being branched. After passing through the splitter 521, the packet data is first up-converted in an IF stage (522-1, 522-2, 525-1, and 525-2) and is finally up-converted in an RF stage (523-1, 523-2, 526-1, and 526-2) into RF band data for a W-LAN service. The up-converted data is E/O-converted by the E/O converter 524-1 and is transmitted to the W-LAN APs 412-11 and 412-22 in a hot spot area through an optical fiber. The W-LAN APs 412-11 and 412-22 provide a W-LAN data service to a mobile terminal after O/E conversion. In addition, a GPS clock from the 3G BTS function block 51 is used as a sync clock of the W-LAN function block 52 for a W-LAN service to perform synchronization of the entire system.

The 3G BTS function block 51 will be described with reference to FIG. 6.

Figure 6:
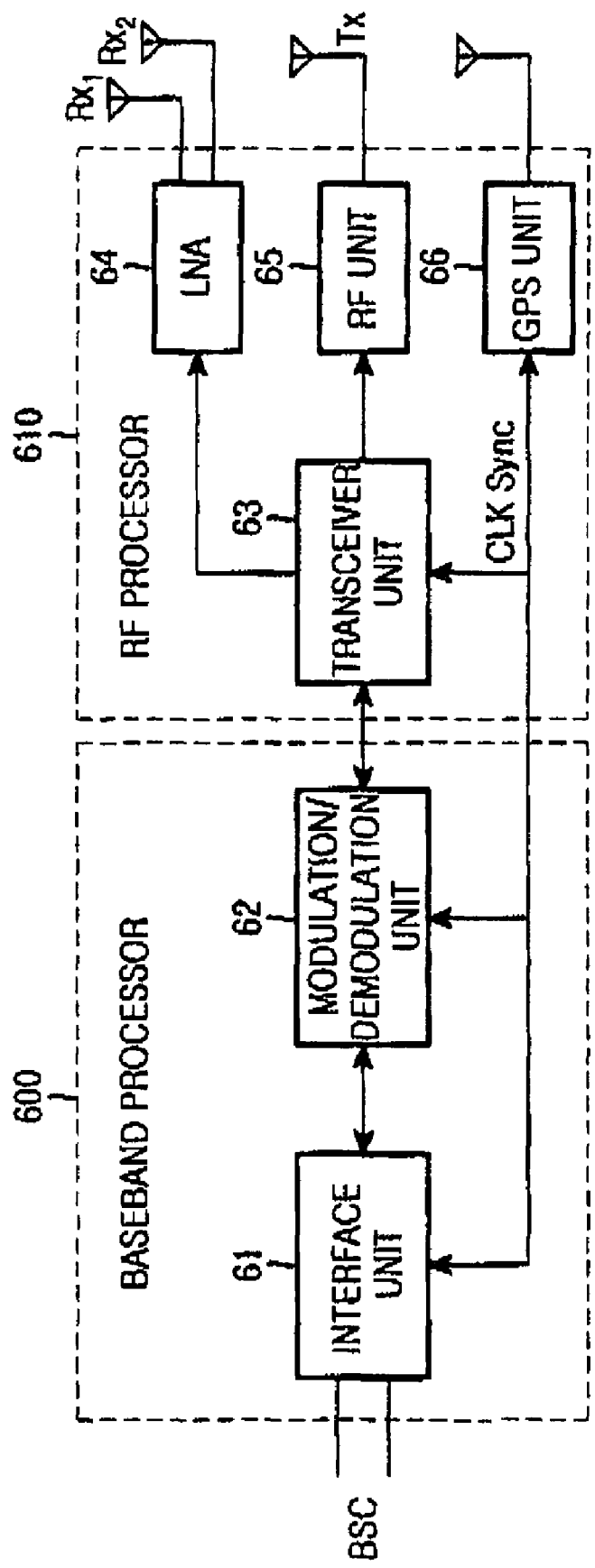
FIG. 6 is a detailed block diagram of a 3G BTS function block of the BTS structure of FIG. 5.

As illustrated in FIG. 6, the 3G BTS function block 51 according to one embodiment of the present invention performs the same function as a BTS of the 3G mobile communication network and includes a baseband processor 600 and an RF processor 610.

More specifically, signals for voice call communication and data communication, transmitted from the BSC 410, are modulated into Code Division Multiple Access (CDMA) signals by the baseband processor 600 and transmitted to a mobile terminal through the RF processor 610. Signals input from the mobile terminal through the RF processor 610 are CDMA-demodulated and transmitted to the BSC 410.

To be more specific, the baseband processor 600 includes an interface unit 61 for connection with the BSC 410 and a modulation/demodulation unit 62 that performs CDMA modulation for downward connection to the mobile terminal and CDMA demodulation for upward connection to the BSC 410. The RF processor 610 includes a transceiver unit 63 that is connected to the modulation/demodulation unit 62 for processing related to radio connection. The further RF processor 610 further include an RF unit 65 that receives data from the transceiver unit 63 and transmits the data to the mobile terminal, a Low Noise Amplifier (LNA) 64 that receives the data transmitted from the mobile terminal through two antennas and transmits the received data to the transceiver unit 63, and a GPS unit 65 that generates a sync clock for system synchronization through a GPS antenna.

In the present invention, to exchange of authentication and billing information related to interworking of the 3G mobile communication network and the W-LAN, the PDSN 406 and the BSC 410 of an existing 3G network are shared. In addition, a W-LAN data path including a router 404 having a path that is different from that of the 3G core network 403 and is configured to remove the instability of a 3G system due to an increase in traffic caused by interworking of the 3G mobile communication network and the W-LAN. Moreover, by combining the BTS structure of the conventional 3G mobile communication network and the W-LAN APs having a remote antenna structure through a RoF link, services for the 3G mobile communication network and the W-LAN system can be simultaneously provided through a single BTS.

Figure 7:
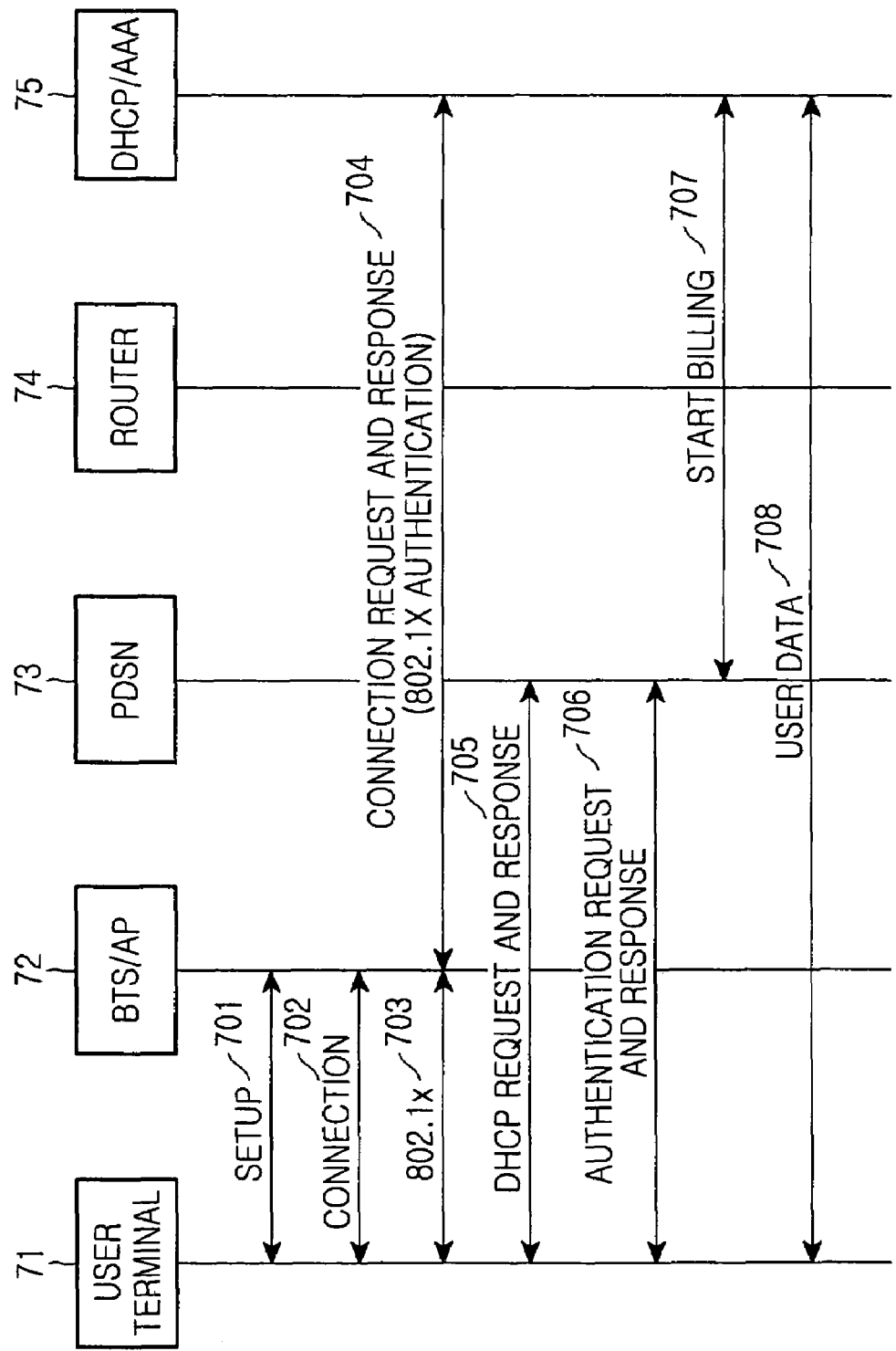
FIG. 7 is a timing diagram for service interworking for a mobile terminal in a network for interworking a W-LAN and a 3G mobile communication network through a RoF link according to a first embodiment of the present invention.

FIG. 7 is a timing diagram for service interworking for a mobile terminal in a network for interworking a W-LAN and a 3G mobile communication network through a RoF link according to a first embodiment of the present invention.

In the interworking network according to the present invention, service interworking for a mobile terminal can be made in two ways. One is interworking when the mobile terminal moves from the 3G mobile communication network to the W-LAN system. The other is interworking when the mobile terminal moves from the W-LAN system to the 3G mobile communication network.

FIG. 7 is a view for explaining interworking when the mobile terminal moves from the 3G mobile communication network to the W-LAN system.

As illustrated in FIG. 7, when a user terminal 71 accesses a W-LAN AP area, system interworking the user terminal 71 and a BTS/AP 72 is set up to accept a data service that has been provided from a 3G mobile communication network through a W-LAN in step 701. Upon association between the user terminal 71 and the BTS/AP 72 in step 702, a communication between the user terminal 71 and the BTS/AP 72 is established in response to W-LAN connection according to 802.1x protocol in step 703. At this time, a connection request for IP address management is transmitted to a DHCP/AAA server 75 through the BTS/AP 72 and a response to the connection request is received, thereby performing connection according to 802.1x protocol in step 704.

A DHCP request and a response thereto are received through a PDSN 73 in step 705 and an authentication request and a response thereto are received through the PDSN 73 in step 706. Upon completion of authentication and security, the DHCP/AAA server 75 starts billing according to a W-LAN system through the PDSN 73 in step 707 and data transmission according to the W-LAN system is made to the user terminal 71 in step 708.

Figure 8:
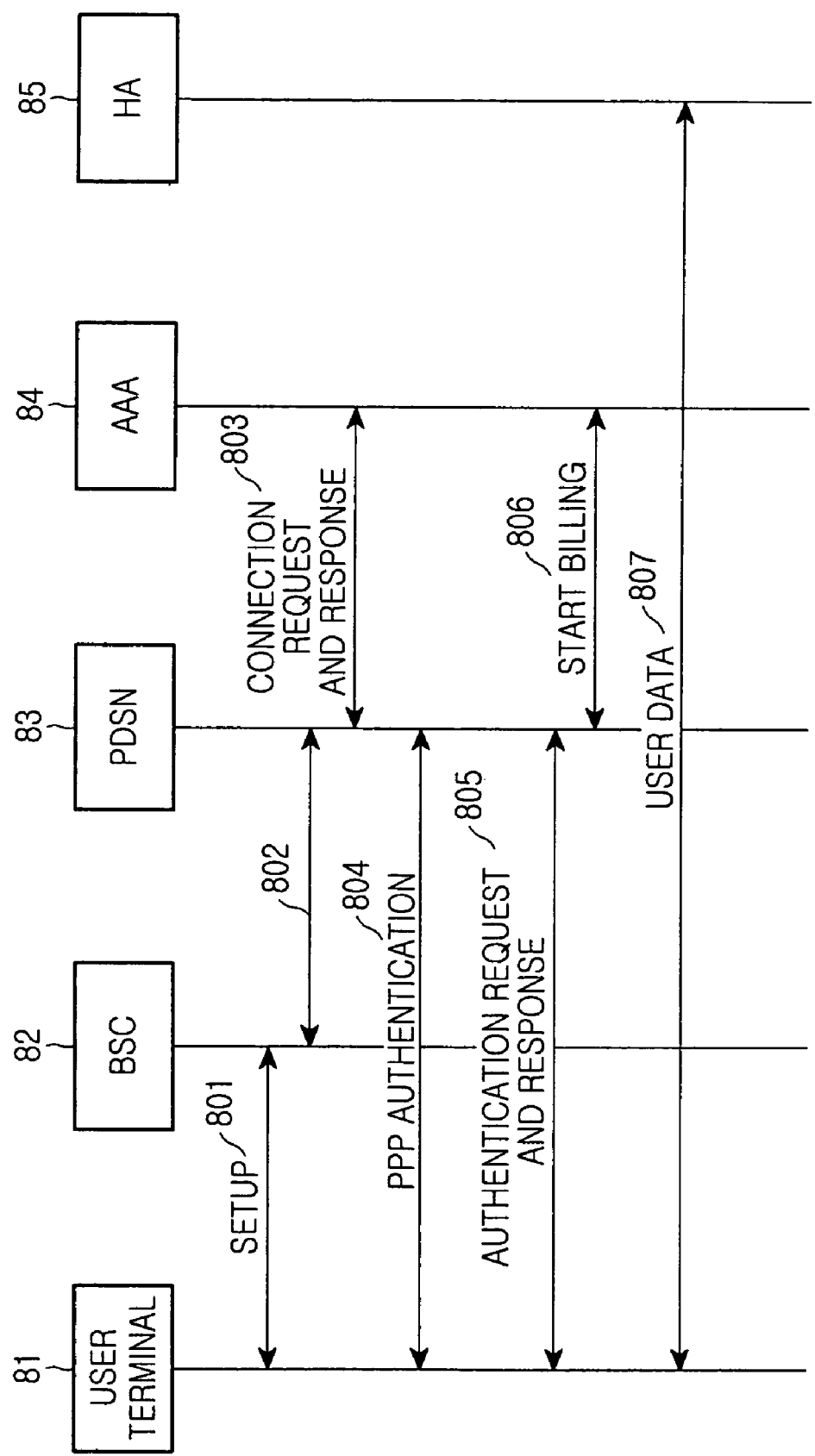
FIG. 8 is a timing diagram for service interworking for a mobile terminal in a network for interworking a W-LAN and a 3G mobile communication network through a RoF link according to a second embodiment of the present invention.

FIG. 8 is a timing diagram for service interworking for a mobile terminal in a network for interworking a W-LAN and a 3G mobile communication network through a RoF link according to a second embodiment of the present invention.

FIG. 8 is a view for explaining interworking when the mobile terminal moves from the W-LAN system to the 3G mobile communication network.

As illustrated in FIG. 8, when a user terminal 81 moves out of a W-LAN AP area and accesses a 3G mobile communication cell, movement of the user terminal 81 is notified to an HA 85 of the 3G mobile communication network through a PDSN 83 upon request from the mobile terminal and channel establishment for sharing a packet data network with a BSC is performed through a BTS to provide a data service from the 3G mobile communication network to the user terminal 81 in step 801. The BSC 82 transmits data to the AAA server 84 through the PDSN 83 according to channel establishment in step 802 and transmits a connection request and receives a response thereto in step 803.

If the connection request is accepted, a connection is made between the user terminal 81 and the PDSN 83 through Point-to-Point Protocol (PPP) authentication in step 804. Upon completion of the connection through PPP authentication, the user terminal 81 transmits a request for authentication with respect to the use of a packet data network of the 3G mobile communication network to the AAA server 84 and receives a response to the request in step 805, thereby completing authentication and security processes with respect to the 3G mobile communication network. Upon completion of the authentication and security processes, the AAA server 84 starts billing according to the packet data network of the 3G mobile communication network through the PDSN 83 in step 806 and transmits data to the user terminal 81 through the packet data network of the 3G mobile communication network in step 807.

As described above, according to the present invention, a network interworking a W-LAN and a 3G mobile communication network through a RoF link is provided, thereby exchanging data for authentication and security processes without additional establishment for the interworking by sharing a BSC and a PDSN of the 3G mobile communication network.

Furthermore, an AAA server is shared like in a conventional tightly coupled network, but a separate router path for a W-LAN system is established. Thus, the instability of a system due to an increase in traffic caused by sharing of a 3G mobile communication network can be overcome.

The present invention can also be embodied as a program on a computer-readable recording medium. Examples of the computer-readable recording medium include Compact Disc Read-Only Memory (CD-ROM), Random-Access Memory (RAM), floppy disks, hard disks, and magneto-optical disks.

While the present invention has been shown and described with reference to preferred embodiments thereof, it will be understood by those skilled in the art that various changes in form and details may be made therein without departing from the spirit and scope of the invention.

What is claimed is:

1. A network system for interworking a Wireless Local Area Network (W-LAN) and a $3^{rd}$-Generation (3G) mobile communication network through a Radio-over-Fiber (RoF) link, the network system comprising:
the 3G mobile communication network including
a voice signal processing network coupled to a Public Switched Telephone Network (PSTN) for voice call processing with respect to a predetermined mobile terminal;
a packet data network for data communication with the predetermined mobile terminal;
a terminal device for communication with the predetermined mobile terminal; and
the W-LAN system coupled to the packet data network of the 3G mobile communication network to provide a W-LAN service to the predetermined mobile communication terminal,
wherein the W-LAN system is implemented in a plurality of Base Transceiver Stations (BTSs) included in the 3G mobile communication network through the RoF link;
wherein the W-LAN system comprises a plurality of W-LAN Access Points (AP) having a remote antenna structure through the RoF link, so that services for each of the 3G mobile communication network and the W-LAN system are simultaneously provided through a single BTS.

2. The network system of claim 1, wherein the packet data network comprises:
a Dynamic Host Configuration Protocol (DHCP) server coupled to the Internet to manage Internet Protocol (IP) addresses of devices included in the W-LAN system and the packet data network.

3. The network system of claim 1, wherein the packet data network further comprises:
an Authentication, Authorization, and Accounting (AAA) server/Home Agent (HA) for performing authentication and position management on the predetermined mobile terminal for a packet data service of the packet data network and the W-LAN system;
a 3G core network interworking with the AAA server/HA to provide the packet data service of the packet data network and the W-LAN system; and
a Packet Data Service Node (PDSN) connected to the 3G core network for connection between the terminal device and the packet data network.

4. The network system of claim 3, further comprising:
a router coupled to the Internet and the PDSN and having a path that is different from that of the 3G core network for data processing at a request for a W-LAN service from the W-LAN system.

5. The network system of claim 2, wherein the terminal device comprises:
the plurality of BTSs for performing connection to the predetermined mobile terminal for voice communication and data communication; and
a Base Station Controller (BSC) coupled to the voice signal processing network and the packet data network to control the plurality of BTSs.

6. The network system of claim 1, wherein the W-LAN system is implemented through the RoF link in the BTS is implemented by coupling the BTSs to a W-LAN Access Points (APs) that perform the W-LAN service, through the RoF link.

7. The network system of claim 1, wherein the packet data network and the terminal device share authentication and billing when a service is changed due to movement of the predetermined mobile terminal for interworking of the W-LAN and the 3G mobile communication network.

8. An authentication method in movement between a $3^{rd}$-Generation (3G) mobile communication network and a Wireless Local Area Network (W-LAN) system comprising the steps of:
providing the 3G mobile communication network including a voice signal processing network coupled to a Public Switched Telephone Network (PSTN) for voice call processing with respect to a predetermined mobile terminal;
providing a packet data network for data communication with the predetermined mobile terminal;
providing a terminal device for communication with the predetermined mobile terminal; and
providing the W-LAN system being connected to the packet data network of the 3G mobile communication network to provide a W-LAN service to the predetermined mobile communication terminal,
wherein the W-LAN system is implemented in a plurality of Base Transceiver Stations (BTSs) included in the 3G mobile communication network through the RoF link,
wherein the W-LAN system comprises a plurality of W-LAN Access Points (AP) having a remote antenna structure through the RoF link when the predetermined mobile terminal accesses a particular W-LAN Access Point (AP) area according to the W-LAN system from a 3G mobile communication network cell; and wherein services for each of the 3G mobile communication network and the W-LAN system are simultaneously provided through a single BTS.

9. The authentication method in claim 8, further comprising the steps of:

performing setup on the predetermined mobile terminal for the W-LAN system to accept a data service that has been received through the 3G mobile communication network;

establishing a communication between the predetermined mobile terminal and the BTSs according to protocol of the W-LAN system upon association between the predetermined mobile terminal and the W-LAN system according to the setup;

connecting the predetermined mobile terminal to the packet data network through the BTSs according to protocol of the W-LAN system; and receiving a response to a request for the use of IP through the packet data network and authenticating the use of IP after the connection.

10. The authentication method in claim 9, further comprising the steps of:

starting billing according to the authentication and accepting the data service through the W-LAN system.

11. The authentication method in claim 8, further comprising the steps of:

providing that the W-LAN system used the 802.1x protocol.

12. The method step of claim 8, further comprising the authentication method steps of:

providing all voice call communication and data communication are modulated into Code Division Multiple Access (CDMA) signals.

13. An authentication method in movement between a $3^{rd}$-Generation (3G) mobile communication network and a Wireless Local Area Network (W-LAN) system comprising the steps of:

providing the 3G mobile communication network including a voice signal processing network connected to a Public Switched Telephone Network (PSTN) for voice call processing with respect to a predetermined mobile terminal;

providing a packet data network for data communication with the predetermined mobile terminal; and providing a terminal device for communication with the predetermined mobile terminal and the W-LAN system being connected to the packet data network of the 3G mobile communication network to provide a W-LAN service to the predetermined mobile communication terminal, wherein the W-LAN system is implemented in a plurality of Base Transceiver Stations (BTSs) included in the 3G mobile communication network through the RoF link, wherein the W-LAN system comprises a plurality of W-LAN Access Points (AP) having a remote antenna structure through the RoF link when the predetermined mobile terminal moves out of a W-LAN Access Point (AP) area according to the W-LAN system and accesses a 3G mobile communication network cell; and wherein services for each of the 3G mobile communication network and the W-LAN system are simultaneously provided through a single BTS.

14. The method step of claim 13, further comprising the authentication method steps of:

notifying movement of the predetermined mobile terminal to a Home Agent (HA) of the 3G mobile communication network upon request from the predetermined mobile terminal;

performing channel establishment for using the packet data network of the 3G mobile communication network;

transmitting a connection request for the packet data network through an authentication server and receiving a response to the connection request, according to the channel establishment;

establishing a connection between the predetermined mobile terminal and a Packet Data Service Node (PDSN);

the predetermined mobile terminal transmitting an authentication request for a service of the 3G mobile communication network to the PDSN of the packet network and receiving a response to the authentication request; and starting billing according to the authentication and accepting the data service through the W-LAN system.

15. The method claim of claim 13, further comprising the authentication method step of:

providing the packet data network and the terminal device share authentication and billing when a service is changed due to movement of the predetermined mobile terminal for interworking of the W-LAN and the 3G mobile communication network.

16. The method step of claim 13, further comprising the authentication method steps of establishing a connection between the predetermined mobile terminal and a Packet Data Service Node (PDSN) through Point-to-Point Protocol (PPP).

17. The method step of claim 12, further comprising the authentication method steps of:

providing all voice call communication and data communication are modulated into Code Division Multiple Access (CDMA) signals.

18. The authentication method in claim 13, further comprising the steps of:

providing that the W-LAN system used the 802.1x protocol.

* * * * *

UNITED STATES PATENT AND TRADEMARK OFFICE
CERTIFICATE OF CORRECTION

PATENT NO.        : 7,653,039 B2                                     Page 1 of 1
APPLICATION NO.   : 11/356822
DATED             : January 26, 2010
INVENTOR(S)       : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Twenty-third Day of November, 2010

David J. Kappos
*Director of the United States Patent and Trademark Office*